US010807717B2

(12) United States Patent
Heimbach et al.

(10) Patent No.: US 10,807,717 B2
(45) Date of Patent: Oct. 20, 2020

(54) AIRCRAFT WITH ANGLED SEATING CONFIGURATION

(71) Applicant: SAFRAN CABIN INC., Huntington Beach, CA (US)

(72) Inventors: Eric Heimbach, Huntington Beach, CA (US); Christopher Schuttera, Huntington Beach, CA (US); Scott Savian, Huntington Beach, CA (US); Ian Geoffrey Scoley, Huntington Beach, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 0 days.

(21) Appl. No.: 16/566,663

(22) Filed: Sep. 10, 2019

(65) Prior Publication Data

US 2020/0130845 A1 Apr. 30, 2020

Related U.S. Application Data

(63) Continuation of application No. PCT/US2019/049031, filed on Aug. 30, 2019.

(60) Provisional application No. 62/751,884, filed on Oct. 29, 2018, provisional application No. 62/751,870, filed on Oct. 29, 2018, provisional application No. 62/751,895, filed on Oct. 29, 2018.

(51) Int. Cl.
*B64D 11/06* (2006.01)

(52) U.S. Cl.
CPC ...... *B64D 11/0601* (2014.12); *B64D 11/0627* (2014.12)

(58) Field of Classification Search
CPC ............ B64D 11/0601; B64D 11/0627; B64C 1/1407; B60N 2/005; B60N 2/01; B60R 21/06

See application file for complete search history.

(56) References Cited

U.S. PATENT DOCUMENTS

| 3,119,441 A | 1/1964 | Furry, Jr. |
| 3,239,167 A * | 3/1966 | Jacobsen ............ B64D 11/0601 244/118.6 |

(Continued)

FOREIGN PATENT DOCUMENTS

| WO | 2017/093871 A1 | 6/2017 |
| WO | 2018178246 A1 | 10/2018 |

OTHER PUBLICATIONS

International Search Report and Written Opinion issued in PCT/US19/49031.

(Continued)

*Primary Examiner* — Medhat Badawi
*Assistant Examiner* — Vicente Rodriguez
(74) *Attorney, Agent, or Firm* — Jeffer Mangels; Butler & Mitchell LLP; Brennan C. Swain, Esq.

(57) ABSTRACT

An aircraft that includes a body that defines a cabin interior and a longitudinal axis, and a front row positioned in the cabin interior. The front row includes a first front seat and a second front seat. The first and second front seats are angled away from one another. The first front seat is angled outwardly such that it forms a first acute angle with the longitudinal axis and the second front seat is angled outwardly such that it forms a second acute angle with the longitudinal axis. The first and second acute angles are approximately the same.

18 Claims, 8 Drawing Sheets

(56) References Cited

U.S. PATENT DOCUMENTS

| | | | |
|---|---|---|---|
| 5,540,402 A * | 7/1996 | Carducci | B64D 9/00 |
| | | | 244/118.1 |
| 7,347,399 B2 | 3/2008 | Bouchet | |
| 7,896,291 B2 | 3/2011 | Dehn | |
| 8,152,096 B2 | 4/2012 | Smith | |
| 8,317,135 B2 | 11/2012 | Carter | |
| 8,800,912 B2 | 8/2014 | Oliver | |
| 8,864,071 B2 | 10/2014 | Vergnaud | |
| 9,126,689 B2 * | 9/2015 | Porter | B60N 2/01 |
| 9,382,007 B2 | 5/2016 | Ersan | |
| 9,476,246 B2 | 10/2016 | Fairchild | |
| 2002/0070314 A1 | 6/2002 | Schmidt-Schaeffer | |
| 2007/0069073 A1 | 3/2007 | Ferry | |
| 2010/0051753 A1 | 3/2010 | Yoeli | |
| 2010/0252680 A1 | 10/2010 | Porter | |
| 2010/0308164 A1 | 12/2010 | McKeever | |
| 2010/0327123 A1 * | 12/2010 | Smith | B64C 27/26 |
| | | | 244/7 C |
| 2013/0076081 A1 | 3/2013 | Curto | |
| 2016/0214702 A1 | 7/2016 | Stucki | |
| 2016/0332734 A1 | 11/2016 | Goode | |
| 2017/0036765 A1 | 2/2017 | Braca | |
| 2017/0203678 A1 * | 7/2017 | Gomez | B60N 2/757 |
| 2017/0320578 A1 * | 11/2017 | Cooke | B64C 1/18 |
| 2018/0194451 A1 * | 7/2018 | Cosby | B64C 1/12 |
| 2018/0195324 A1 * | 7/2018 | Amante | B64C 1/1407 |

OTHER PUBLICATIONS

International Search Report and Written Opinion issued in PCT/US19/49022.
International Search Report and Written Opinion issued in PCT/US19/58481.
https://www.simflight.com/2011/04/16/review-carenado-b58-baron-fsx-using-arezone-sound-pack/ ("Simflight") dated Apr. 16, 2011.
International Search Report and Written Opinion issued in PCT/US19/49034.

* cited by examiner

AIRCRAFT WITH ANGLED SEATING CONFIGURATION

CROSS REFERENCE TO RELATED APPLICATIONS

This is a continuation of International Application PCT/US19/49031, with an international filing date of Aug. 30, 2019, which claims the benefit of U.S. Provisional Application Nos. 62/751,870, filed Oct. 29, 2018, 62/751,884, filed Oct. 29, 2018 and 62/751,895, filed Oct. 29, 2018, the entireties of which are incorporated herein by reference.

FIELD OF THE INVENTION

The present invention relates generally to an aircraft with an angled seating configuration.

BACKGROUND OF THE INVENTION

With the rise in popularity in ride sharing, small aircraft that can accommodate a small number of passengers for relatively short (e.g., intra-city) trips are contemplated. In such a situation the passengers may not know each other and privacy may be a concern. Accordingly, the present invention provides seats that are angled away from one another.

SUMMARY OF THE PREFERRED EMBODIMENTS

In accordance with a first aspect of the present invention there is provided an aircraft that includes a body that defines a cabin interior, a divider member that divides the cabin interior into a cargo hold and a passenger cabin, front and back rows of seats positioned in the passenger cabin, a forward door that is pivotable between a closed position and an open position, and an aft door that is pivotable between a closed position and an open position. Pivoting one of the forward door or the aft door from the closed to the open position causes the other of the forward door or the aft door to pivot from the closed position to the open position. In a preferred embodiment, the body includes a side opening, and, in their closed positions, the forward and aft doors are positioned in the side opening. The side opening includes a front row access portion (where a passenger can enter the front row), a back row access portion (where a passenger can enter the back row) and a cargo hold access portion (where a passenger can reach into the cargo hold to put luggage in or remove luggage). Preferably, in the closed position, the forward door blocks access to the front row access portion and the aft door blocks access to the back row access portion and the cargo hold access portion. In a preferred embodiment, the forward door pivots in one of a clockwise or a counter-clockwise direction and the aft door pivots in the other of the clockwise or the counter-clockwise direction.

In a preferred embodiment, the divider member separates the passenger cabin from the cargo hold such that a passenger in the passenger cabin cannot access the cargo hold when the front and aft doors are in the closed positions. Preferably, the cargo hold includes a shelf therein that is pivotable between a stowed and a deployed position. When the shelf is in the deployed position the cargo hold is divided into upper and lower storage sections. In a preferred embodiment, the divider member includes a ledge, and in the deployed position the shelf rests on the ledge.

In a preferred embodiment, pivoting one of the forward door or the aft door from the open position to the closed position causes the other of the forward door or the aft door to pivot from the open position to the closed position. Preferably, the aircraft is a vertical take-off and landing aircraft and is not a helicopter.

In accordance with another aspect of the present invention there is provided an aircraft that includes a body that defines a cabin interior and a longitudinal axis, a front row and a back row positioned in the cabin interior. The front row includes a first front seat and a second front seat. The first and second front seats are angled away from one another. The first front seat is angled outwardly such that it forms a first acute angle with the longitudinal axis and the second front seat is angled outwardly such that it forms a second acute angle with the longitudinal axis. The first and second acute angles are approximately the same. In a preferred embodiment, the back row includes a first back seat and a second back seat. The first and second back seats are angled away from one another. The first back seat is angled outwardly such that it forms a third acute angle with the longitudinal axis, the second back seat is angled outwardly such that it forms a fourth acute angle with the longitudinal axis, and the third and fourth acute angles are the approximately same. In a preferred embodiment, the first, second, third and fourth acute angles are approximately the same. However, they can also be different.

In a preferred embodiment, the aircraft of claim 1 includes a front bench seat assembly that includes the first front seat and second front seat. Preferably, the front bench seat assembly includes a center portion that separates the first front seat from the second front seat. In a preferred embodiment, the center portion includes a front edge and a rear edge, and the front edge has a greater dimension than the rear edge. The center portion is generally triangular or generally trapezoidal in shape.

In a preferred embodiment, the aircraft includes a cockpit positioned forward of the front row and a first foot space is defined on a first side of the cockpit and a second foot space is defined on a second side of the cockpit.

In accordance with another aspect of the present invention there is provided a bench seat assembly that includes a first seat that includes a seat portion and a back, a second seat that includes a seat portion and a back, and a center portion positioned between the first and second seats. The first seat is bifurcated by a first vertical plane, the second seat is bifurcated by a second vertical plane, and the center portion is bifurcated by a center vertical plane. The first seat is angled outwardly such that the first plane defines a first acute angle with the center plane, the second seat is angled outwardly such that the second plane defines a second acute angle with the center plane, and the first acute angle and the second acute angle are approximately the same. In a preferred embodiment, the center portion includes a front edge and a rear edge and the front edge has a greater dimension than the rear edge.

In a preferred embodiment, the center portion includes a drawer that is movable between an open and a closed position. The drawer includes a front edge and a rear edge and the front edge has a greater dimension than the rear edge. In a preferred embodiment, the center portion includes a cover that is movable between an open and a closed position. The cover includes a front edge and a rear edge and the front edge has a greater dimension than the rear edge. An embodiment is contemplated where the center portion includes both a cover and a drawer. In a preferred embodiment, the center portion includes a cushion thereon that includes a front edge and a rear edge. The front edge has a greater dimension than the rear edge. Preferably, the center portion is generally triangular or generally trapezoidal in shape. In a preferred embodiment, the center portion includes a baby seat thereon.

In a preferred embodiment, the present invention provides simultaneous access to a vehicle's passenger cabin and the cargo hold when the doors are open and simultaneously closes the passenger cabin and cargo hold. It therefore enables passengers to themselves access the vehicle's cargo hold during boarding and deboarding, but not during flight or travel.

In a preferred embodiment, the present invention is used in a vertical take-off and landing (VTOL) aircraft. However, this is not a limitation and the concepts disclosed herein can be used in other vehicles and aircraft. In a preferred embodiment, the VTOL is not a helicopter. In a preferred embodiment, the VTOL is an electric VTOL (referred to as an eVTOL). However, the VTOL can also be powered by gasoline or other fuel. Furthermore, the aircraft can be manned (with a pilot) or unmanned (autonomous). In a preferred embodiment, the VTOL's passenger cabin (passenger zone) and cargo hold (cargo zone) are configured to enable the capability of one door/hatch to close both zones or allow access to both zones. Preferably, the passenger cabin is entirely accessible with two doors on one side of the vehicle. The forward door swings outwardly (e.g., clockwise) to allow ingress/egress to the forward passenger seat row (e.g., in a vehicle with two rows). The rear door swings outwardly (e.g., counterclockwise) pivoted from the aft vertical edge of the opening in the side of the vehicle, thereby exposing the rear passenger seat row and the cargo hold. The cargo zone holds the passenger's luggage and is preferably separated from the passenger cabin by a partition or divider member. In a preferred embodiment, no access between zones (cargo and passenger) is allowed during flight.

In a preferred embodiment, the present invention enables simple passenger ingress/egress with smooth lateral sliding between two lateral seating positions, seating for two, oriented towards the outboard or outside of the vehicle, which allows the passengers to face away from one another on a single bench and provides a sense of privacy.

In a preferred embodiment, the present invention provides a single seating apparatus or bench with the capability to seat one or two passengers. Multiple benches can be provided in a single passenger cabin. The bench contains two seating positions that are symmetrically angled away from the centerline of the vehicle. The angle preferably prevents the two adjacent passengers from being in each other's line of sight. The angled seating also aligns the passengers toward the outboard of the vehicle, which facilitate a window. Preferably, safety harnesses or seatbelts are provided for both passengers on the bench.

In a preferred embodiment, the spaces beside or either side of the pilot is used for passenger space (e.g., foot space). Enhanced outdoor views for passengers and connected services, such as phone charging (e.g., inductive phone charging).

Angled seating to compress the seats together while maintaining comfort levels for a short flight. The layout locates a "row" that contains two seat positions that are symmetrically angled away from the centerline of the vehicle. The angle also allows the front row passengers to use the space on the sides of the pilot or, in the case of an autonomous vehicle, the space on either side of one of the vehicle's components (e.g., engine). The two angled seats creates a zone or center portion that is generally triangular or trapezoidal in shape. Generally triangular or trapezoidal means that when viewed from above (in plan) the center portion generally look like a triangle or trapezoid. Some seats have a slight curve on their outer edge. Also, the front and rear edges of the center portion may have a slight curve or may not be completely straight. Furthermore, the corners may be rounded. Therefore, if the seat or front or rear edges of the center portion have a slight curve or the corners are curved or rounded, this does not take them out of the definition of generally triangular or trapezoidal. This zone can be used for multiple purposes or variations. For example, the zone can be used for auxiliary features, such as ancillary services, as auxiliary storage, a rear facing infant seat or third passenger (in row) seating. The ancillary service variant enables a platform where passengers, VTOLs and third party vendors can connect and supply desired services. For example, the passenger can use a device with the appropriate software to order an item, e.g., food or drinks prior to flight. The third party vendor (or VTOL) can then prepare and fulfill the customer's order. For example, this can be done by the VTOL and third party vendor connecting via a vertiport rendezvous where the order is inserted into the ancillary service unit in the triangular zone (or other location) designated to the passenger that ordered the service. When the passenger arrives to the VTOL the order can be verified and accepted.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
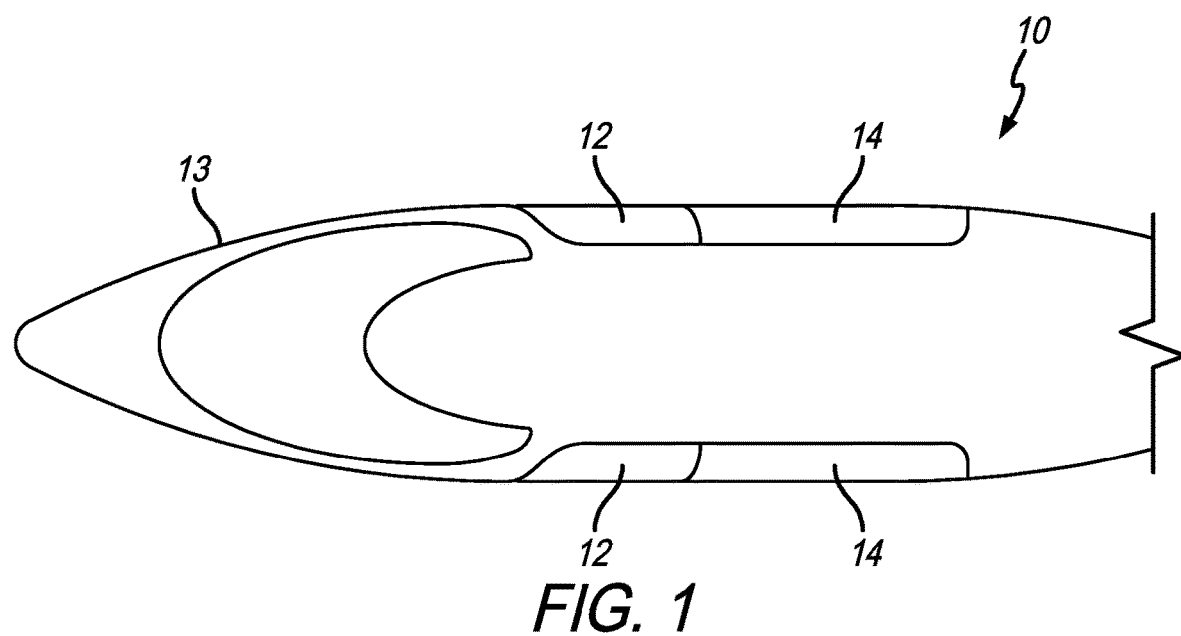
FIG. 1 is a plan view of a VTOL aircraft with forward and aft doors in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-13 show a VTOL aircraft 10 and components therefor that include a number of inventive features.

FIGS. 1-5 include forward and aft doors 12 and 14 that open simultaneously and are positioned in a side opening 11 of the aircraft body 13. In a preferred embodiment, the forward and aft doors 12 and 14 are operatively connected such that opening the forward door 12 or moving the forward door 12 from the closed to the open position causes the aft door 14 to also move from the closed to the open position. Furthermore, opening the aft door 14 or moving the aft door 14 from the closed to the open position causes the forward door 12 to also move from the closed to the open position. The simultaneous opening and closing can be accomplished by mechanical mechanisms, electric mechanisms or a combination of both.

Figure 2:
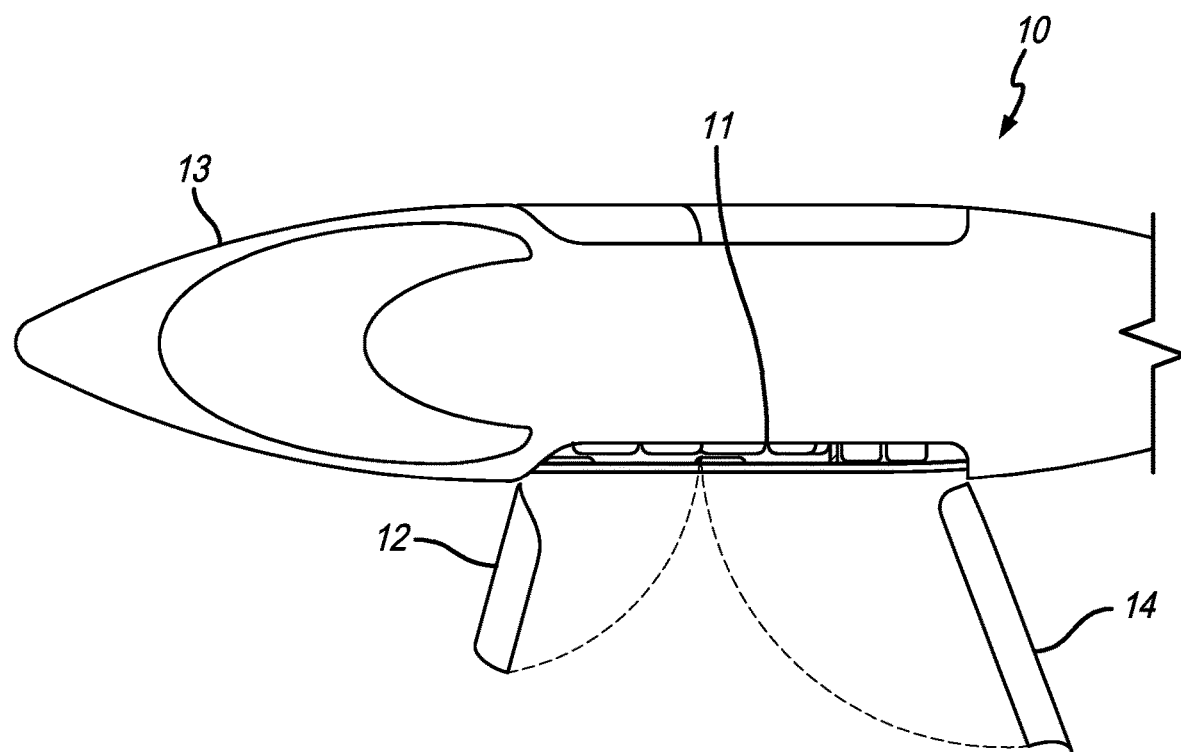
FIG. 2 is a plan view of the aircraft of FIG. 1 with the forward and aft doors in the open position.
Figure 3:
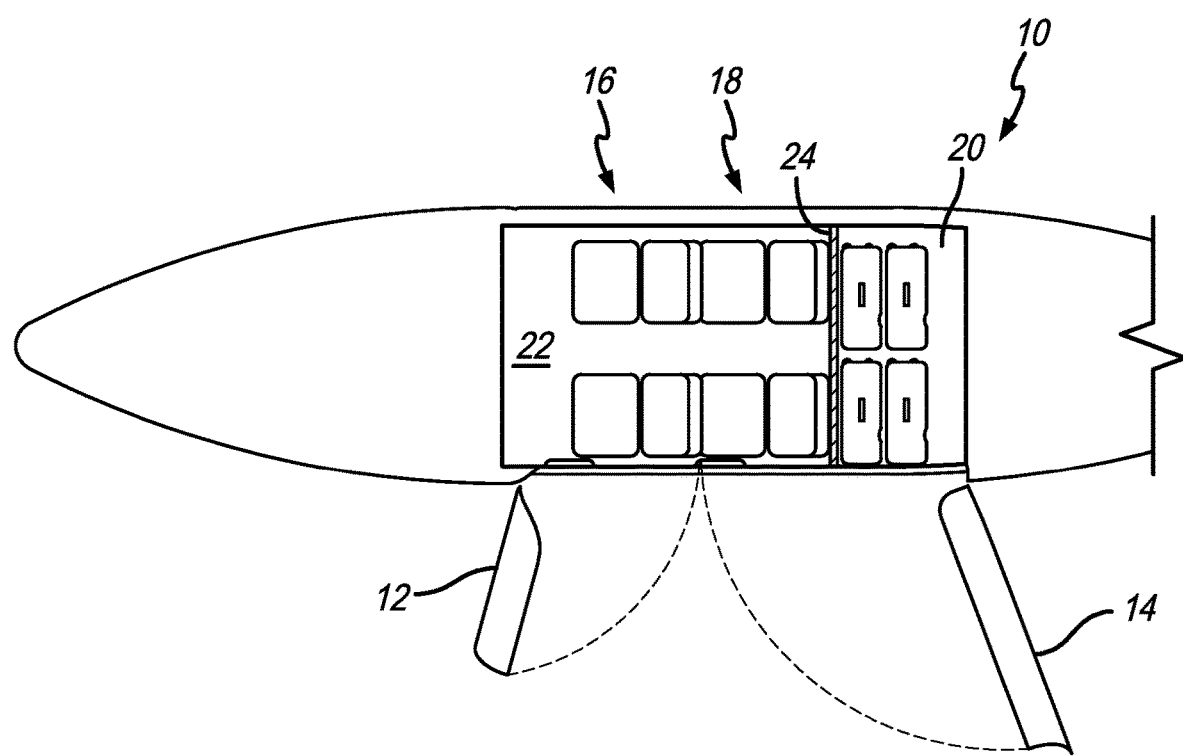
FIG. 3 is a plan view of the aircraft of FIG. 1 with the forward and aft doors in the open position and showing the passenger area and cargo hold.

The dashed lines in FIGS. 2 and 3 show the closing path of the doors. As shown, the forward door 12 provides access to the front row of seats 16 and the aft door 14 provides access to the back row of seats 18 and the cargo hold 20. The cargo hold 20 is separated from the passenger cabin 22 by a divider member 24, which prevents passengers seated in the back row 18 from reaching back into the cargo hold 20.

Figure 4:
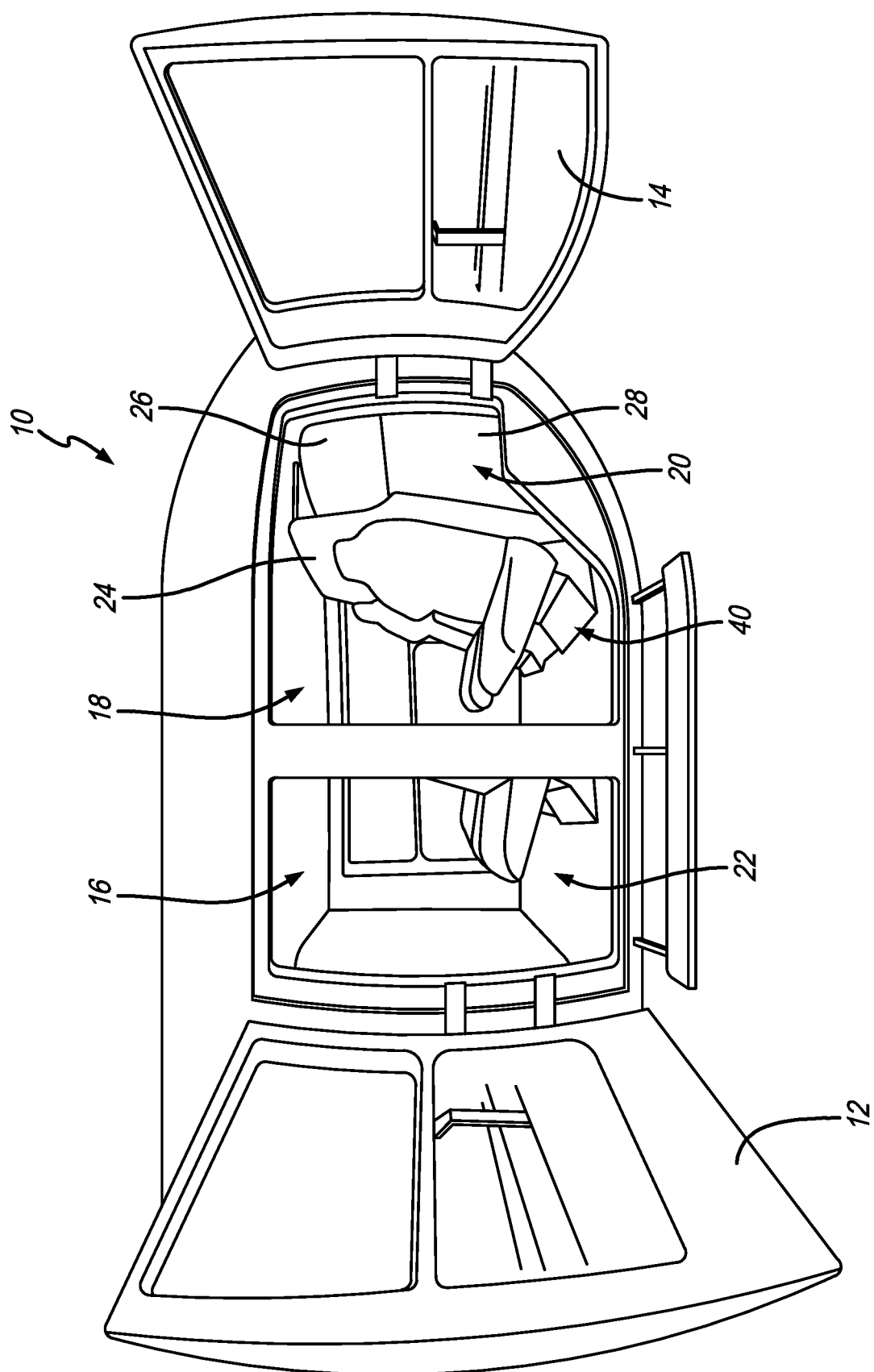
FIG. 4 is a perspective view of the aircraft with the forward and aft doors open.
Figure 5:
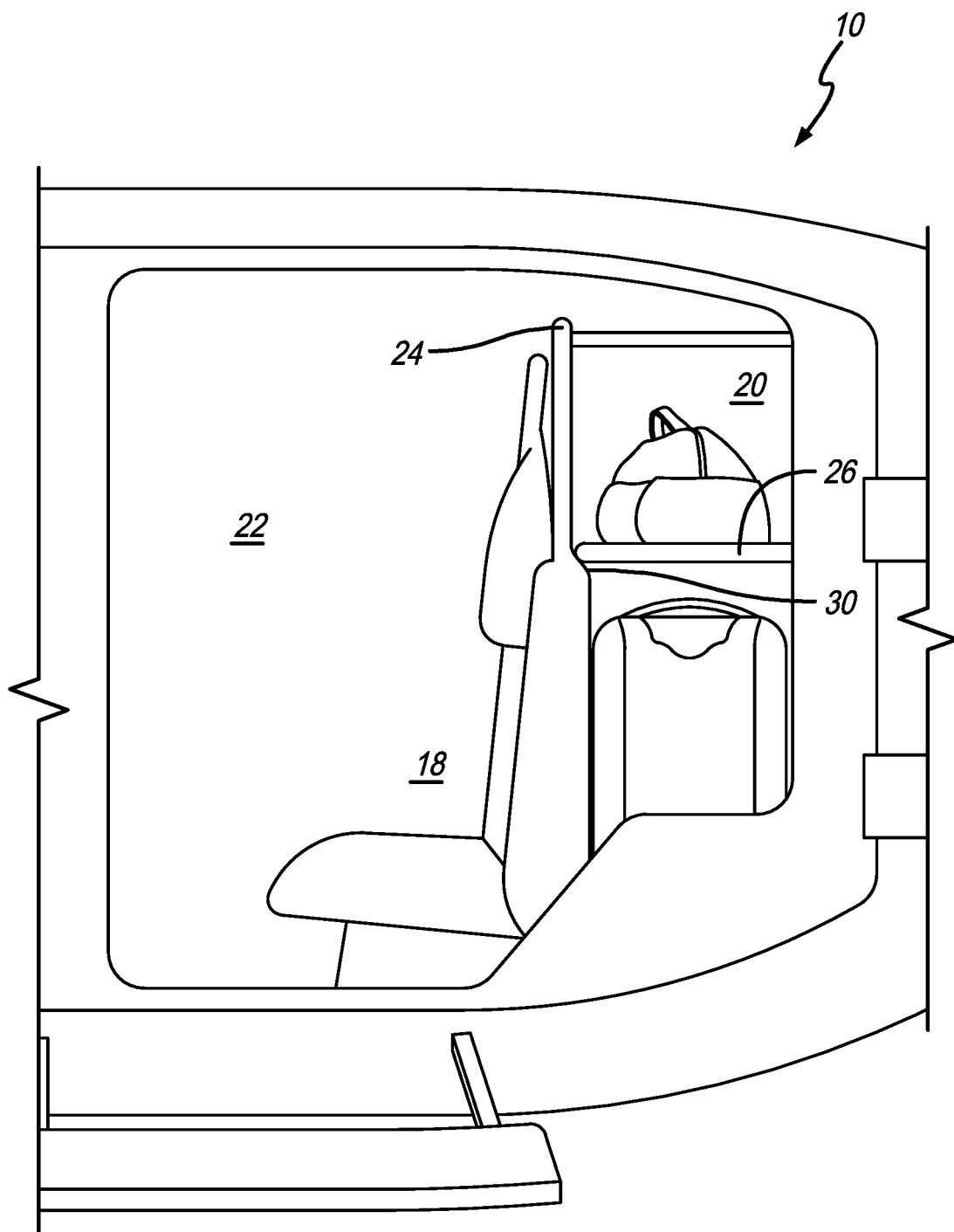
FIG. 5 is side elevational view of the rear seat row and the cargo hold.

As shown in FIGS. 4 and 5, in a preferred embodiment, the cargo hold 20 includes a pivotable shelf 26 that is movable between a stowed position (see FIG. 4) and a deployed position (see FIG. 5). Preferably, the shelf 26 is pivotably connected to the back wall 28 of the cargo hold 20 and pivots downwardly such that it rests on a ledge 30 on the divider member 24. The shelf 26 divides the cargo hold 20 into upper and lower storage sections. In another embodiment, more than one shelf can be included. Any seating arrangement is within the scope of the present invention. As shown in FIGS. 2-3, the aircraft 10 can include forward facing seats that are separate within each row, or, as shown in FIGS. 4-13, the aircraft 10 can include bench seats that are angled outwardly.

Figure 6:
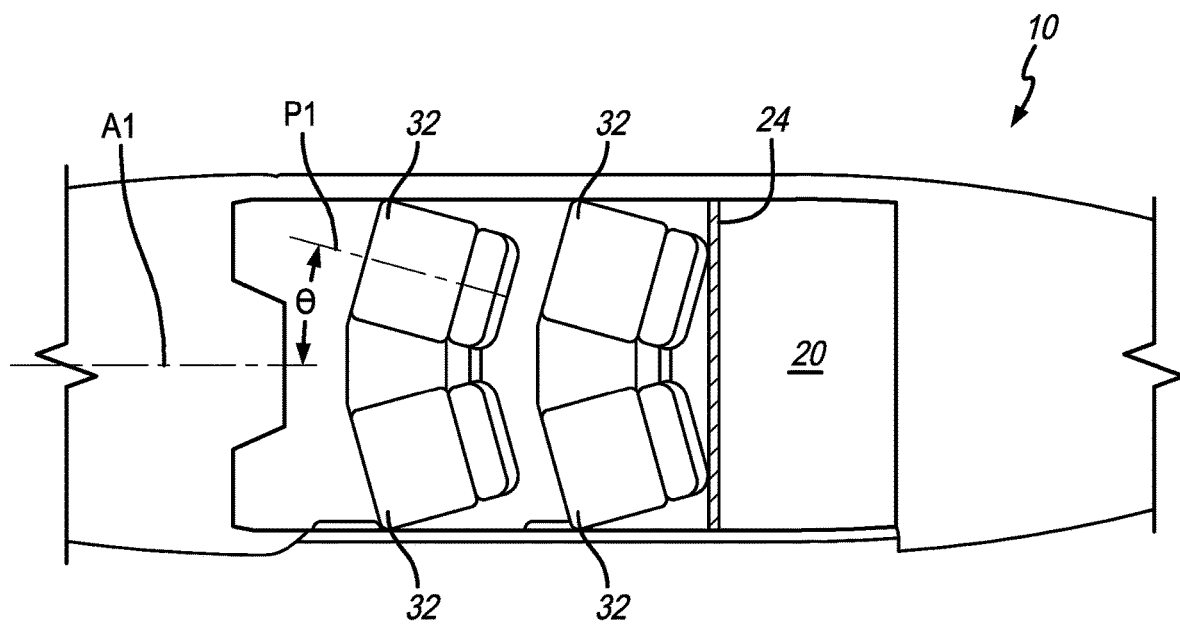
FIG. 6 is a top plan view of a VTOL aircraft with angled seating.
Figure 7:
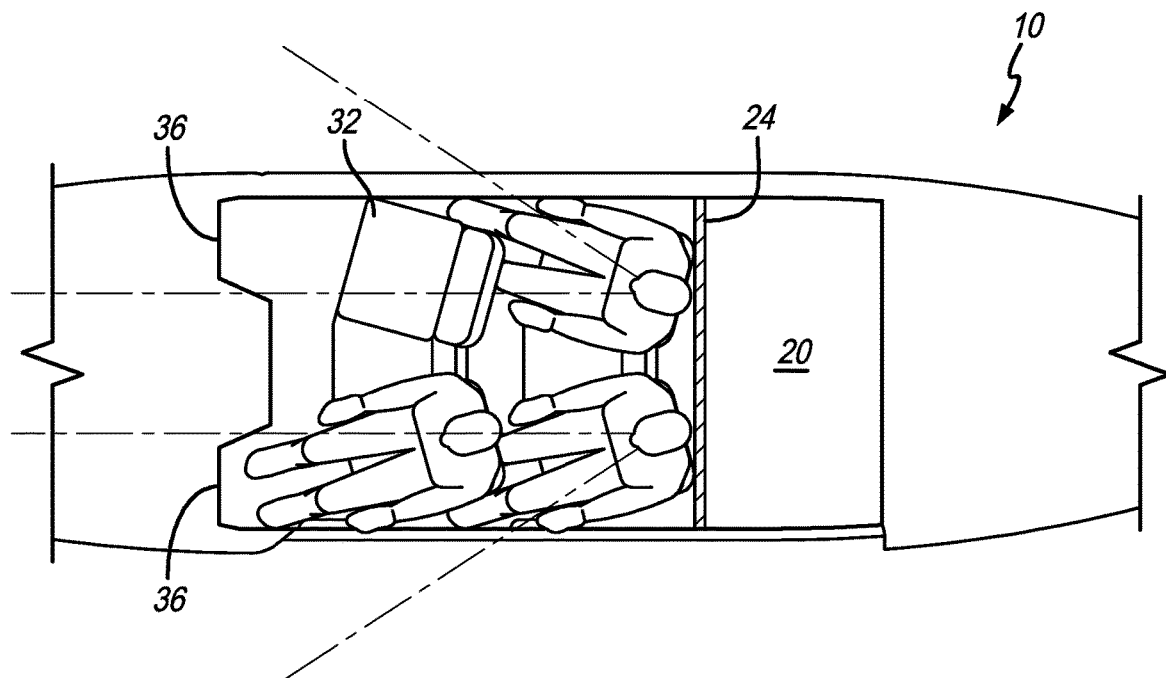
FIG. 7 is a top plan view of the aircraft of FIG. 6 with passengers therein and showing the passengers' lines of site.
Figure 8:
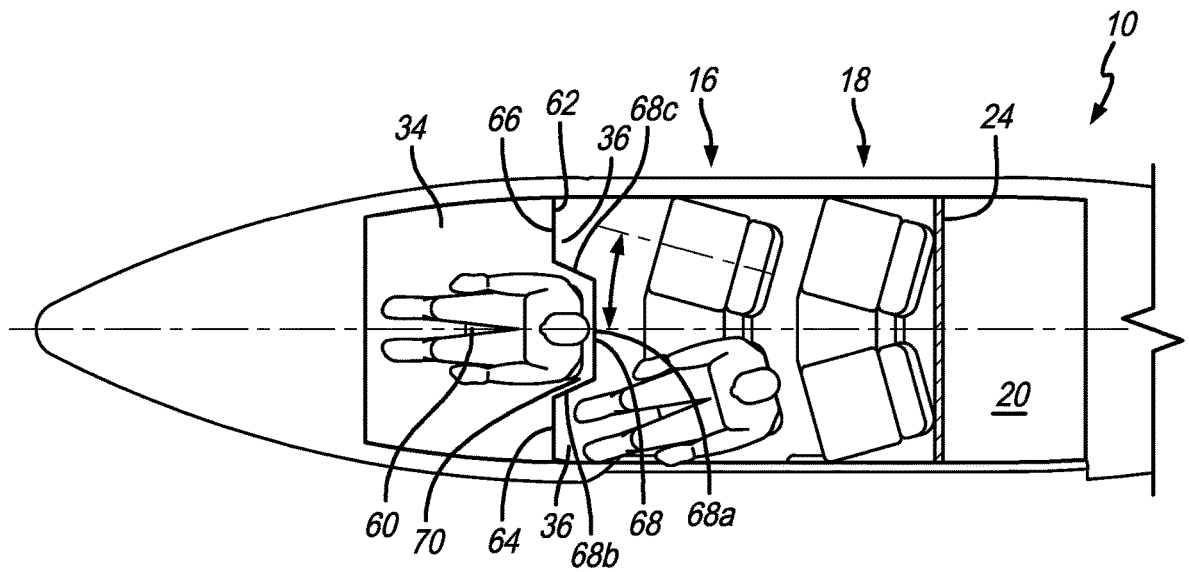
FIG. 8 is a top plan view of the aircraft of FIG. 6 that includes a pilot space.

FIGS. 6-8 show plan views of a seating arrangement that includes the front and back rows 16 and 18 with angled seats 32. The angle preferably prevents the two adjacent passengers from being in each other's line of sight. The angled seating also aligns the passengers toward the outboard of the aircraft 10. FIG. 6 shows an angle θ between the seat 32 (or a vertical plane P1 that bifurcates the seat) and the longitudinal axis A1 of the aircraft 10 (or a vertical plane that bifurcates the bench seat assembly and/or the center portion). Preferably, the angle is symmetrical for the seats 32 on both sides of the aircraft 10. Also, preferably, the seats in both rows include approximately the same outward angle. The angle θ can be any angle between 1° and 89°, but is preferably less than 45°. The embodiment shown in the drawings includes an angle of 10° off the center line for both seats. FIG. 7 shows passengers seated in some of the seats and gives an example of their sight lines. Approximately the same means that the angles are within at least a few degrees of one another.

FIG. 8 shows a cockpit 34 that includes a seat 60 for a pilot. In a preferred embodiment, the cabin 22 includes foot space 36 on opposite sides of the pilot where the front row passengers can place their feet. A divider member 62 divides the cabin interior into the cockpit 34 and the passenger cabin 22. The divider member includes a first section 64 positioned on the first side of the cabin interior, a second section 66 positioned on the second side of the cabin interior and a connector section 68 extending between the first and second sections 64 and 66. As shown in FIG. 8, the first and second sections 64 and 66 are positioned forwardly of the connector section 68. The first section 64 and at least a portion of the connector section 68, and the second section 66 and at least a portion of the connector section 68 define the foot spaces 36 for the passengers seated in the front row 16. The foot spaces 36 are positioned transverse to at least a portion of the cockpit 34, as shown in FIG. 8. The connector section 68 defines a transverse section 68a and first and second angled portions 68b and 68c. The first angled portion 68b and the first section 64 cooperate to define one foot space 36 and the second angled portion 68c and the second section 66 cooperate to define the other foot space 36. The connector section 68 also defines an alcove 70 in the cockpit 34. In an embodiment with a pilot seat 60, the pilot seat is at least partially positioned in the alcove 70. FIGS. 6-7 also show the foot space 36 on opposite sides of a forward area of the aircraft. As used herein, the term cockpit does not necessarily mean that room or seating is provided for a pilot. Accordingly, the space in FIGS. 6-7 (a pilotless embodiment) is still referred to as cockpit 34. Foot space for the passengers in the back row can be provided on either side of the front row seats.

Figure 9:
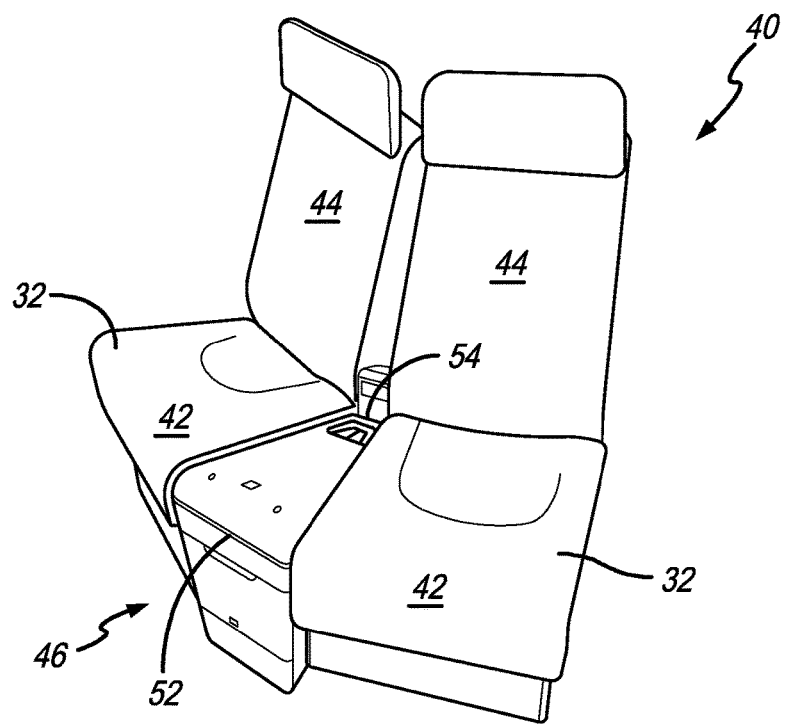
FIG. 9 is a perspective view of a bench contains two seating positions that are symmetrically angled away from one another.
Figure 10:
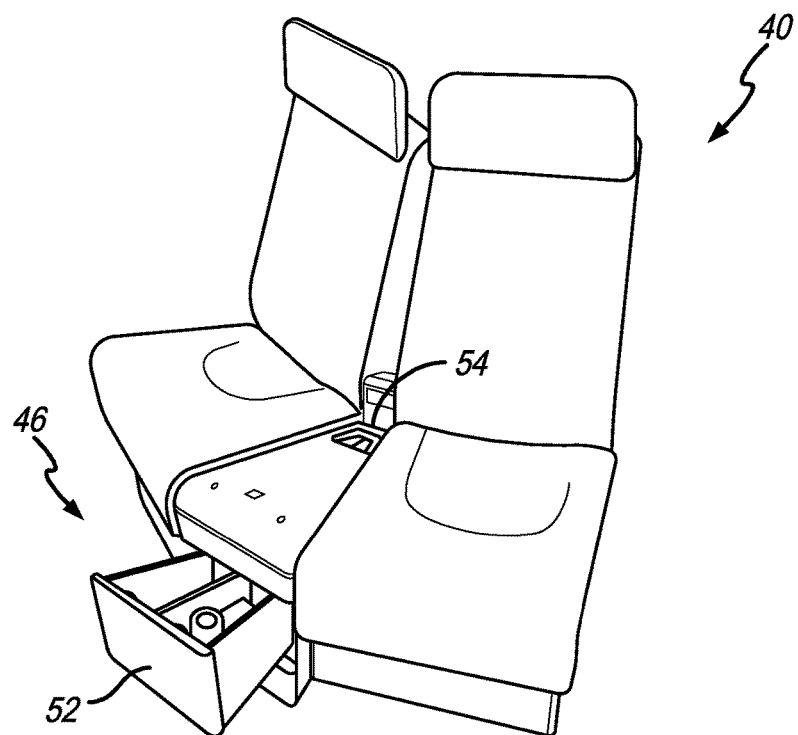
FIG. 10 is a perspective view of the bench including a storage drawer.
Figure 11:
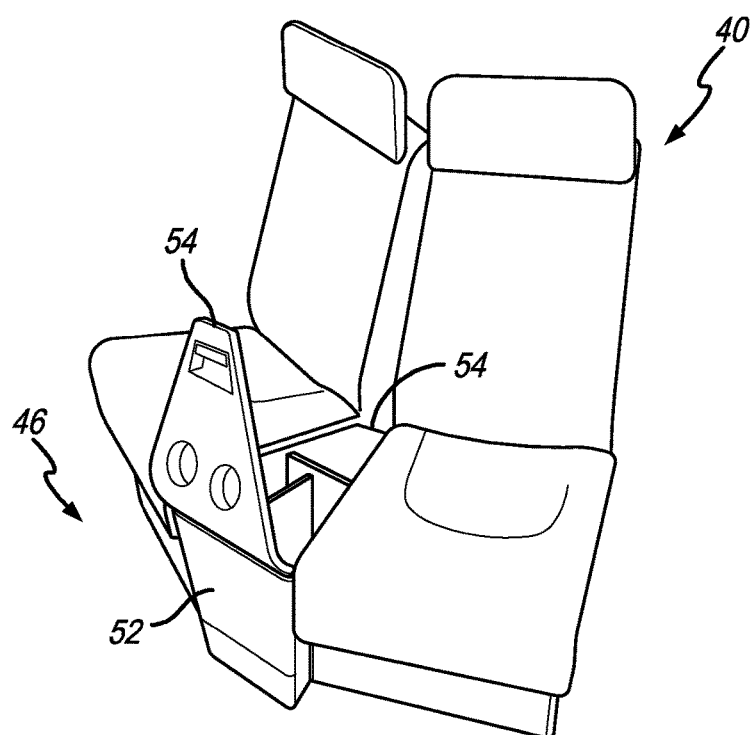
FIG. 11 is a perspective view of the bench including an openable top for storage.

FIGS. 9-13 show various configurations of bench seat assemblies 40 that include at least two seats 32 with a seat portion 42 and a back 44. The seats 32 are angled outwardly. In a preferred embodiment, the bench seat assembly 40 includes a center portion 46 that can include different components therein. FIGS. 9-11 show the center portion 46 with storage capabilities. FIG. 10 shows the center portion 46 with a drawer 48 that opens forwardly. FIG. 11 shows the center portion 46 with a cover 50 that opens upwardly to provide access to storage therein. As is shown in FIGS. 10-11, the center portion 46, drawer 48 and cover 50 are shaped such that they fit into the center portion 46. Therefore, they each have a front edge or surface 52 that has a wider or longer dimension that a rear edge or surface 54.

Figure 12:
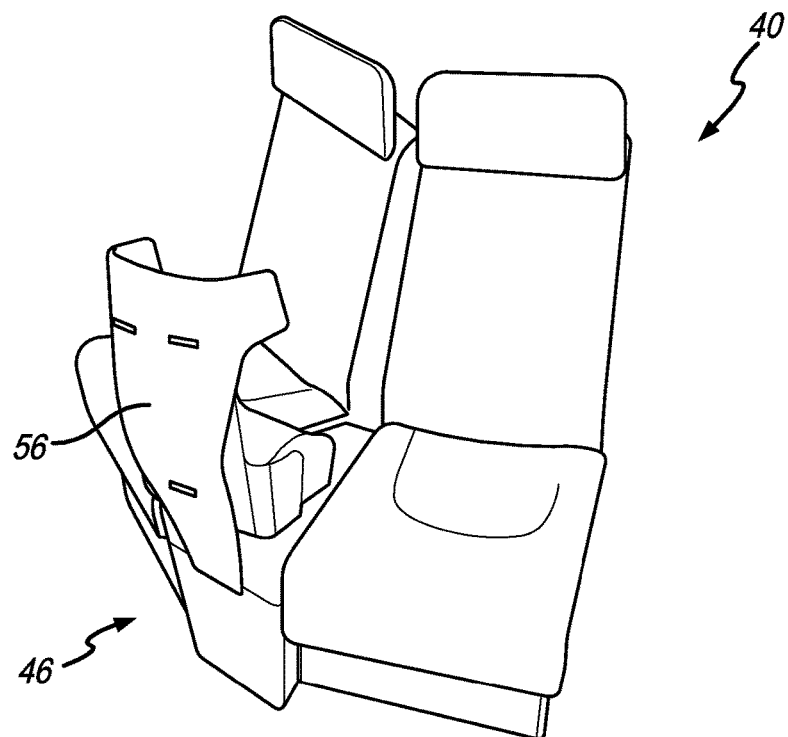
FIG. 12 is a perspective view of the bench including a child seat.
Figure 13:
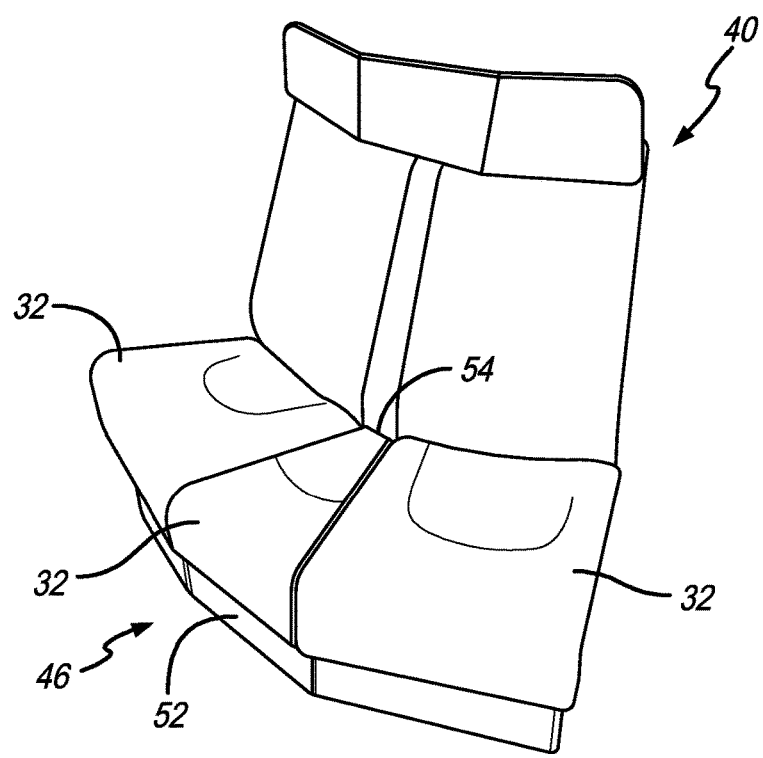
FIG. 13 is a perspective view of the bench including a center seat.

FIG. 12 shows a bench seat assembly 40 with a baby seat 56 in the center portion 46. The baby seat can be stowable within the center portion 46 and can deploy into the position shown in FIG. 12. In another embodiment, the center portion 46 can include the requisite attachments so that a commercially available baby seat can be connected to the center portion 46. FIG. 13 includes another seat 32 or cushion in the center portion 46. This can provide seating for a third person in the row or can provide overlap for a larger person seated in either of the seats. It will be appreciated that any of the bench seating assemblies discussed herein can be included in any of the aircraft embodiments discussed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A vertical take-off and landing aircraft comprising:
a body that defines a cabin interior and a longitudinal axis, and
a front row positioned in the cabin interior, wherein the front row includes a first front seat and a second front seat, wherein the first and second front seats are angled away from one another, wherein the first front seat is angled outwardly such that it forms a first acute angle with the longitudinal axis, wherein the second front seat is angled outwardly such that it forms a second acute angle with the longitudinal axis, and wherein the first and second acute angles are approximately the same, a first divider member that divides the cabin interior into a cockpit and a passenger cabin, wherein the cockpit is positioned forward of the front row, wherein the front row is positioned directly aft of the first divider member, wherein the first divider member includes a first section positioned on the first side of the cabin interior, a second section positioned on the second side of the cabin interior, and a connector section extending between the first and second sections, wherein the first and second sections are positioned forwardly of the connector section, wherein the first section and at least a portion of the connector section define a first foot space, whereby a first passenger seated in the first front seat can place their feet in the first foot space, wherein the second section and at least a portion of the connector section define a second foot space, whereby a second passenger seated in the second front seat can place their feet in the second foot space, wherein the first and second foot spaces are positioned transverse to at least a portion of the cockpit.

2. The vertical take-off and landing aircraft of claim 1 further comprising a back row positioned in the cabin interior aft of the front row, wherein the back row includes a first back seat and a second back seat, wherein the first and second back seats are angled away from one another, wherein the first back seat is angled outwardly such that it forms a third acute angle with the longitudinal axis, wherein the second back seat is angled outwardly such that it forms a fourth acute angle with the longitudinal axis, and wherein the third and fourth acute angles are the approximately same.

3. The vertical take-off and landing aircraft of claim 2 wherein the first, second, third and fourth acute angles are approximately the same.

4. The vertical take-off and landing aircraft of claim 1 further comprising a front bench seat assembly that includes the first front seat and second front seat.

5. The vertical take-off and landing aircraft of claim 4 wherein the front bench seat assembly includes a center portion that separates the first front seat from the second front seat.

6. The vertical take-off and landing aircraft of claim 5 wherein the center portion includes a front edge and a rear edge, and wherein the front edge has a greater dimension than the rear edge.

7. The vertical take-off and landing aircraft of claim 6 wherein the center portion is generally triangular or generally trapezoidal in shape.

8. The vertical take-off and landing aircraft of claim 2 further comprising:
a front bench seat assembly that includes the first front seat and second front seat, wherein the front bench seat assembly includes a center portion that separates the first front seat from the second front seat, wherein the center portion includes a front edge and a rear edge, and wherein the front edge has a greater dimension than the rear edge, and a back bench seat assembly positioned aft of the front bench seat assembly, wherein the back bench seat assembly includes the first back seat and second back seat, wherein the back bench seat assembly includes a center portion that separates the first back seat from the second back seat, wherein the center portion includes a front edge and a rear edge, and wherein the front edge has a greater dimension than the rear edge.

9. The vertical take-off and landing aircraft of claim 8 further comprising:
a second divider member that divides the cabin interior into a cargo hold and a passenger cabin,
a forward door that is pivotable between a closed position and an open position, and
an aft door that is pivotable between a closed position and an open position, wherein pivoting one of the forward door or the aft door from the closed to the open position causes the other of the forward door or the aft door to pivot from the closed position to the open position.

10. The vertical take-off and landing aircraft of claim 1 further comprising a second divider member that divides the cabin interior into a cargo hold and the passenger cabin,
a forward door that is pivotable between a closed position and an open position, and
an aft door that is pivotable between a closed position and an open position, wherein the body includes a side opening, wherein in their closed positions, the forward and aft doors are positioned in the side opening, wherein the side opening includes a front row access portion, a back row access portion and a cargo hold access portion, wherein the front row access portion is defined in the body directly transverse to the front row of seats when the forward door is in the open position, wherein in the closed position, the forward door blocks access to the front row access portion, wherein the back row and cargo hold access portions are defined in the body when the aft door is in the open position, wherein the back row access portion is defined in the body directly transverse to the back row of seats, wherein the cargo hold access portion is defined in the body directly transverse to the cargo hold, wherein in the closed position, the aft door blocks access to the back row access portion and the cargo hold access portion.

11. The vertical take-off and landing aircraft of claim 6 wherein the center portion includes a drawer that is movable between an open and a closed position, wherein the drawer includes a front edge and a rear edge, and wherein the front edge has a greater dimension than the rear edge.

12. The vertical take-off and landing aircraft of claim 6 wherein the center portion includes a cover that is movable between an open and a closed position, wherein the cover includes a front edge and a rear edge, and wherein the front edge has a greater dimension than the rear edge.

13. The vertical take-off and landing aircraft of claim 6 wherein the center portion includes a cushion thereon, wherein the cushion includes a front edge and a rear edge, and wherein the front edge has a greater dimension than the rear edge.

14. An aircraft comprising:
a body that defines a cabin interior and a longitudinal axis,
a front row positioned in the cabin interior, wherein the front row includes a first front seat and a second front seat, wherein the first and second front seats are angled away from one another, wherein the first front seat is angled outwardly such that it forms a first acute angle with the longitudinal axis, wherein the second front seat is angled outwardly such that it forms a second acute angle with the longitudinal axis, and wherein the first and second acute angles are approximately the same,
a back row positioned in the cabin interior aft of the front row, wherein the back row includes a first back seat and a second back seat, wherein the first and second back seats are angled away from one another, wherein the first back seat is angled outwardly such that it forms a third acute angle with the longitudinal axis, wherein the second back seat is angled outwardly such that it forms a fourth acute angle with the longitudinal axis, and wherein the first, second, third and fourth acute angles are the approximately same, a cockpit positioned forward of the front row, and a first divider member that divides the cabin interior into the cockpit and a passenger cabin, wherein the front row is positioned directly aft of the first divider member, wherein the first divider member includes a first section positioned on the first side of the cabin interior, a second section positioned on the second side of the cabin interior, and a connector section extending between the first and second sections, wherein the first and second sections are positioned forwardly of the connector section, wherein the first section and at least a portion of the connector section define a first foot space, whereby a first passenger seated in the first front seat can place their feet in the first foot space, wherein the second section and at least a portion of the connector section define a second foot space, whereby a second passenger seated in the second front seat can place their feet in the second foot space, wherein the first and second foot spaces are positioned transverse to at least a portion of the cockpit.

15. The aircraft of claim 14 further comprising a front bench seat assembly that includes the first front seat and second front seat and a back bench seat assembly that includes the first back seat and second back seat, wherein the front bench seat assembly includes a center portion that separates the first front seat from the second front seat, wherein the center portion includes a front edge and a rear edge, and wherein the front edge has a greater dimension than the rear edge, wherein the back bench seat assembly includes a center portion that separates the first back seat from the second back seat, and wherein the center portion includes a front edge and a rear edge, and wherein the front edge has a greater dimension than the rear edge.

16. The vertical take-off and landing aircraft of claim 1 wherein the connector section defines a transverse section and first and second angled portions, wherein the first angled portion and the first section cooperate to define the first foot space, and wherein the second angled portion and the second section cooperate to define the second foot space.

17. The vertical take-off and landing aircraft of claim 1 further comprising a pilot seat positioned in the cockpit, wherein the connector section defines an alcove in the cockpit, wherein the pilot seat is at least partially positioned in the alcove.

18. The vertical take-off and landing aircraft of claim 17 wherein the first foot space is positioned transversely on a first side of the pilot seat, and wherein the second foot space is positioned transversely on a second side of the pilot seat.

* * * * *